US010991247B2

(12) United States Patent
Baldwin et al.

(10) Patent No.: US 10,991,247 B2
(45) Date of Patent: Apr. 27, 2021

(54) METHOD OF AUTOMATICALLY CONTROLLING AN AUTONOMOUS VEHICLE BASED ON ELECTRONIC MESSAGES FROM ROADSIDE INFRASTRUCTURE OR OTHER VEHICLES

(71) Applicant: Aptiv Technologies Limited, St. Michael (BB)

(72) Inventors: Craig A. Baldwin, Peasant Ridge, MI (US); Robert James Myers, Saline, MI (US)

(73) Assignee: Aptiv Technologies Limited, St. Michael (BB)

( * ) Notice: Subject to any disclaimer, the term of this patent is extended or adjusted under 35 U.S.C. 154(b) by 287 days.

(21) Appl. No.: 16/172,133

(22) Filed: Oct. 26, 2018

(65) Prior Publication Data
US 2019/0066498 A1 Feb. 28, 2019

Related U.S. Application Data

(63) Continuation of application No. 15/546,196, filed as application No. PCT/US2015/064235 on Dec. 7, 2015, now abandoned.
(Continued)

(51) Int. Cl.
*G08G 1/16* (2006.01)
*B60W 10/04* (2006.01)
(Continued)

(52) U.S. Cl.
CPC .......... *G08G 1/096725* (2013.01); *B60T 7/00* (2013.01); *B60T 7/18* (2013.01);
(Continued)

(58) Field of Classification Search
CPC .. G08G 1/00; G08G 1/096725; G08G 1/0965; G08G 1/096741; G08G 1/096783;
(Continued)

(56) References Cited

U.S. PATENT DOCUMENTS 5,629,690 A 5/1997 Knoll
5,995,898 A 11/1999 Tuttle
(Continued)

FOREIGN PATENT DOCUMENTS

EP 3078987 10/2016
JP H07190732 7/1995
(Continued)

OTHER PUBLICATIONS

"Advisory Action", U.S. Appl. No. 15/549,061, dated Apr. 29, 2019, 6 pages.
(Continued)

*Primary Examiner* — Yonel Beaulieu
(74) *Attorney, Agent, or Firm* — Colby Nipper PLLC

(57) ABSTRACT

A method of operating a vehicle, such as an autonomous vehicle, includes the steps of receiving a message from roadside infrastructure via an electronic receiver and providing, by a computer system in communication with said electronic receiver, instructions based on the message to automatically implement countermeasure behavior by a vehicle system. Additionally or alternatively, the method may include the steps of receiving a message from another vehicle via an electronic receiver and providing, by a computer system in communication with said electronic receiver, instructions based on the message to automatically implement countermeasure behavior by a vehicle system.

3 Claims, 10 Drawing Sheets

Related U.S. Application Data

(60) Provisional application No. 62/112,786, filed on Feb. 6, 2015.

(51) Int. Cl.

| | | |
|---|---|---|
| *B60W 10/18* | (2012.01) | |
| *G05D 1/00* | (2006.01) | |
| *G05D 1/02* | (2020.01) | |
| *B60W 30/09* | (2012.01) | |
| *B60W 30/18* | (2012.01) | |
| *B60T 7/18* | (2006.01) | |
| *B60T 7/22* | (2006.01) | |
| *B60W 10/20* | (2006.01) | |
| *B60W 30/00* | (2006.01) | |
| *B60T 7/00* | (2006.01) | |
| *G08G 1/0967* | (2006.01) | |
| *G08G 1/0965* | (2006.01) | |
| *G08G 1/0968* | (2006.01) | |
| *B60W 30/188* | (2012.01) | |

(52) U.S. Cl.
CPC .............. *B60T 7/22* (2013.01); *B60W 10/04* (2013.01); *B60W 10/18* (2013.01); *B60W 10/20* (2013.01); *B60W 30/00* (2013.01); *B60W 30/09* (2013.01); *B60W 30/188* (2013.01); *B60W 30/18163* (2013.01); *G05D 1/0088* (2013.01); *G05D 1/0223* (2013.01); *G05D 1/0261* (2013.01); *G05D 1/0274* (2013.01); *G05D 1/0285* (2013.01); *G08G 1/0965* (2013.01); *G08G 1/0968* (2013.01); *G08G 1/096741* (2013.01); *G08G 1/096783* (2013.01); *G08G 1/16* (2013.01); *G08G 1/166* (2013.01); *B60T 2201/022* (2013.01); *B60T 2210/32* (2013.01); *B60W 2510/20* (2013.01); *B60W 2520/10* (2013.01); *B60W 2554/801* (2020.02); *B60W 2556/45* (2020.02); *G05D 2201/0213* (2013.01)

(58) Field of Classification Search
CPC ........ G08G 1/0968; G08G 1/16; G08G 1/166; B60T 2201/022; B60T 2210/32; B60W 10/00; B60W 10/04; B60W 10/18; B60W 10/20; B60W 30/00; B60W 30/09; B60W 30/18163; B60W 30/188; G05D 1/00; G05D 1/0088; G05D 1/0223; G05D 1/0261; G05D 1/0274; G05D 1/0285; G05D 2201/0213

See application file for complete search history.

(56) References Cited

U.S. PATENT DOCUMENTS

| | | |
|---|---|---|
| 6,442,473 B1 | 8/2002 | Berstis et al. |
| 6,526,352 B1 | 2/2003 | Breed et al. |
| 6,707,391 B1 | 3/2004 | Monroe |
| 6,747,779 B1 | 6/2004 | Morin et al. |
| 6,810,321 B1 | 10/2004 | Cook |
| 6,862,537 B2 | 3/2005 | Skrbina et al. |
| 6,864,784 B1 | 3/2005 | Loeb |
| 6,919,917 B1 | 7/2005 | Janssen |
| 6,959,994 B2 | 11/2005 | Fujikawa et al. |
| 7,075,427 B1 | 7/2006 | Pace et al. |
| 7,103,460 B1 | 9/2006 | Breed |
| 7,637,631 B2 | 12/2009 | McDermott et al. |
| 8,199,046 B2 | 6/2012 | Nanami |
| 8,478,472 B2 | 7/2013 | Bageshwar et al. |
| 8,480,142 B2 | 7/2013 | Wuerfel |
| 8,521,352 B1 | 8/2013 | Ferguson et al. |
| 8,589,014 B2 | 11/2013 | Fairfield et al. |
| 8,600,606 B2 | 12/2013 | Nickolaou et al. |
| 8,612,135 B1 | 12/2013 | Montemerlo et al. |
| 8,718,861 B1 | 5/2014 | Montemerlo et al. |
| 8,781,669 B1 | 7/2014 | Teller et al. |
| 8,818,682 B1 | 8/2014 | Dolgov et al. |
| 8,825,259 B1 | 9/2014 | Ferguson et al. |
| 8,825,265 B1 | 9/2014 | Ferguson et al. |
| 8,849,494 B1 | 9/2014 | Herbach et al. |
| 8,855,849 B1 | 10/2014 | Ferguson et al. |
| 8,874,267 B1 | 10/2014 | Dolgov et al. |
| 8,874,305 B2 | 10/2014 | Dolgov et al. |
| 8,874,372 B1 | 10/2014 | Zhu et al. |
| 8,880,272 B1 | 11/2014 | Ferguson et al. |
| 8,935,034 B1 | 1/2015 | Zhu et al. |
| 9,274,526 B2 | 3/2016 | Murai et al. |
| 9,377,531 B2 | 6/2016 | Rostocki et al. |
| 9,429,440 B2 | 8/2016 | Harada |
| 9,501,058 B1 | 11/2016 | Mariet |
| 10,083,607 B2 * | 9/2018 | Ginsberg ............... G08G 1/081 |
| 10,209,717 B2 | 2/2019 | Hazelton |
| 10,311,724 B2 * | 6/2019 | Ginsberg ......... G08G 1/096775 |
| 10,525,901 B2 | 1/2020 | Lewis et al. |
| 10,678,261 B2 | 6/2020 | Baldwin |
| 10,948,924 B2 | 3/2021 | Baldwin et al. |
| 2005/0187701 A1 | 8/2005 | Baney |
| 2005/0280552 A1* | 12/2005 | DiPiazza ................ G08G 1/052 340/905 |
| 2007/0005202 A1 | 1/2007 | Breed |
| 2007/0005609 A1 | 1/2007 | Breed |
| 2007/0046448 A1 | 3/2007 | Smitherman |
| 2007/0055446 A1 | 3/2007 | Schiffmann et al. |
| 2008/0225395 A1 | 9/2008 | Veerasamy |
| 2009/0140887 A1 | 6/2009 | Breed et al. |
| 2009/0164109 A1 | 6/2009 | Maruyama |
| 2010/0007523 A1 | 1/2010 | Hatav |
| 2010/0013615 A1 | 1/2010 | Herbert et al. |
| 2010/0023183 A1 | 1/2010 | Huang et al. |
| 2010/0026555 A1 | 2/2010 | Whittaker et al. |
| 2010/0063720 A1 | 3/2010 | Machino |
| 2010/0073194 A1 | 3/2010 | Ghazarian |
| 2010/0104199 A1 | 4/2010 | Zhang et al. |
| 2010/0106356 A1 | 4/2010 | Trepagnier et al. |
| 2010/0238006 A1 | 9/2010 | Grider et al. |
| 2011/0012755 A1 | 1/2011 | Mudalige |
| 2011/0125405 A1 | 5/2011 | Blesener et al. |
| 2011/0161987 A1 | 6/2011 | Huang et al. |
| 2011/0163904 A1 | 7/2011 | Alland et al. |
| 2011/0184605 A1 | 7/2011 | Neff |
| 2011/0210866 A1 | 9/2011 | Klaus et al. |
| 2012/0022776 A1 | 1/2012 | Razavilar |
| 2012/0039084 A1 | 2/2012 | Eckhardt et al. |
| 2012/0041632 A1 | 2/2012 | Bordes |
| 2012/0083987 A1 | 4/2012 | Schwindt |
| 2012/0139754 A1* | 6/2012 | Ginsberg ......... G08G 1/096775 340/905 |
| 2012/0166033 A1 | 6/2012 | Byun et al. |
| 2012/0169526 A1 | 7/2012 | Reihac |
| 2012/0249794 A1 | 10/2012 | Kiyo et al. |
| 2012/0274481 A1* | 11/2012 | Ginsberg ......... G08G 1/096883 340/905 |
| 2012/0277967 A1 | 11/2012 | Isaji et al. |
| 2012/0296539 A1 | 11/2012 | Cooprider et al. |
| 2013/0110368 A1 | 5/2013 | Zagorski |
| 2013/0127190 A1 | 5/2013 | Shamoto |
| 2013/0131908 A1 | 5/2013 | Trepagnier et al. |
| 2013/0184926 A1 | 7/2013 | Spero et al. |
| 2013/0191022 A1 | 7/2013 | Mathes et al. |
| 2013/0218396 A1 | 8/2013 | Moshchuk et al. |
| 2013/0231825 A1 | 9/2013 | Chundrlik et al. |
| 2013/0265563 A1 | 10/2013 | Vogt et al. |
| 2013/0271292 A1 | 10/2013 | McDermott |
| 2013/0321627 A1 | 12/2013 | Turn et al. |
| 2013/0338858 A1 | 12/2013 | Cherepinsky |
| 2014/0012455 A1 | 1/2014 | Neff |
| 2014/0032093 A1 | 1/2014 | Mills |
| 2014/0081507 A1 | 3/2014 | Urmson |
| 2014/0081573 A1 | 3/2014 | Urmson et al. |
| 2014/0191882 A1* | 7/2014 | Varma ............ G08G 1/096783 340/905 |

(56) References Cited

U.S. PATENT DOCUMENTS

| | | | |
|---|---|---|---|
| 2014/0204599 A1 | 7/2014 | Miura et al. | |
| 2014/0210646 A1 | 7/2014 | Subramanua | |
| 2014/0297093 A1 | 10/2014 | Murai et al. | |
| 2014/0330479 A1 | 11/2014 | Dolgov et al. | |
| 2015/0006005 A1 | 1/2015 | Yu et al. | |
| 2015/0019080 A1 | 1/2015 | Schneider | |
| 2015/0041510 A1 | 2/2015 | Frenzel et al. | |
| 2015/0100189 A1* | 4/2015 | Tellis | G08G 1/096791 701/23 |
| 2015/0124096 A1 | 5/2015 | Koravadi | |
| 2016/0004915 A1 | 1/2016 | Chen et al. | |
| 2016/0035221 A1 | 2/2016 | McDevitt-Pimbley et al. | |
| 2016/0035223 A1 | 2/2016 | Gutmann et al. | |
| 2016/0161267 A1 | 6/2016 | Harada | |
| 2016/0231746 A1 | 8/2016 | Hazelton et al. | |
| 2017/0039850 A1* | 2/2017 | Vanden Berg | G08G 1/096725 |
| 2017/0371036 A1 | 12/2017 | Griffin | |
| 2018/0004220 A1 | 1/2018 | Hazelton | |
| 2018/0004221 A1 | 1/2018 | Hazelton | |
| 2018/0004223 A1 | 1/2018 | Baldwin | |
| 2018/0012492 A1 | 1/2018 | Baldwin et al. | |
| 2018/0031696 A1 | 2/2018 | Lewis et al. | |
| 2018/0037171 A1 | 2/2018 | Lewis et al. | |
| 2018/0045826 A1 | 2/2018 | Kasaba et al. | |
| 2018/0129215 A1 | 5/2018 | Hazelton et al. | |
| 2019/0003895 A1 | 1/2019 | Krishnan et al. | |
| 2019/0066498 A1 | 2/2019 | Baldwin et al. | |
| 2019/0101929 A1 | 4/2019 | Baldwin | |
| 2019/0202355 A1 | 7/2019 | Tatara et al. | |
| 2019/0210436 A1 | 7/2019 | Frederick et al. | |
| 2020/0341487 A1 | 10/2020 | Hazelton et al. | |

FOREIGN PATENT DOCUMENTS

| | | |
|---|---|---|
| JP | 2004326705 | 11/2004 |
| JP | 2007106199 | 4/2007 |
| JP | 2008003959 | 1/2008 |
| JP | 2008008870 | 1/2008 |
| JP | 2010260493 | 11/2010 |
| JP | 2014148293 | 8/2014 |
| JP | 2014148393 | 8/2014 |
| JP | 2014211862 | 11/2014 |
| KR | 20010109873 | 12/2001 |
| KR | 20100068944 | 6/2010 |
| KR | 20110023952 | 3/2011 |
| KR | 101071914 | 10/2011 |
| KR | 20120072020 | 7/2012 |
| KR | 20130026934 | 3/2013 |
| WO | 2009070069 | 6/2009 |
| WO | 2016126319 | 8/2016 |
| WO | 2016126323 | 8/2016 |
| WO | 20160126318 | 8/2016 |
| WO | 2019059026 | 3/2019 |

OTHER PUBLICATIONS

"Advisory Action", U.S. Appl. No. 15/545,957, dated Jul. 16, 2019, 3 pages.
"Final Office Action", U.S. Appl. No. 15/549,061, dated Feb. 7, 2019, 9 pages.
"Final Office Action", U.S. Appl. No. 15/545,957, dated Apr. 17, 2019, 22 pages.
"Final Office Action", U.S. Appl. No. 15/546,196, dated Aug. 28, 2018, 16 pages.
"International Preliminary Report on Patentability", Application No. PCT/US2015/064235, dated Aug. 17, 2017, 12 pages.
"International Preliminary Report on Patentability", Application No. PCT/US2015/064243, dated Aug. 17, 2017, 12 pages.
"International Preliminary Report on Patentability", Application No. PCT/US2015/064282, dated Aug. 17, 2017, 16 pages.
"International Preliminary Report on Patentability", Application No. PCT/US2015/064225, dated Aug. 17, 2017, 6 pages.
"International Preliminary Report on Patentability", Application No. PCT/US2015/064283, dated Aug. 17, 2017, 6 pages.
"International Preliminary Report on Patentability", Application No. PCT/US2015/064289, dated Aug. 17, 2017, 6 pages.
"International Preliminary Report on Patentability", Application No. PCT/US2016/014797, dated Aug. 17, 2017, 6 pages.
"International Preliminary Report on Patentability", Application No. PCT/US2015/064231, dated Aug. 17, 2017, 7 pages.
"International Preliminary Report on Patentability", Application No. PCT/US2015/064240, dated Aug. 17, 2017, 7 pages.
"International Preliminary Report on Patentability", Application No. PCT/US2016/016045, dated Aug. 17, 2017, 7 pages.
"International Search Report and Written Opinion", Application No. PCT/US2015/064289, dated Mar. 2, 2016, 7 pages.
"International Search Report and Written Opinion", Application No. PCT/US2015/064282, dated Mar. 18, 2016, 17 pages.
"International Search Report and Written Opinion", Application No. PCT/US2015/064240, dated Mar. 16, 2016, 8 pages.
"International Search Report and Written Opinion", Application No. PCT/US2015/064235, dated Mar. 22, 2016, 14 pages.
"International Search Report and Written Opinion", Application No. PCT/US2015/064243, dated Mar. 30, 2016, 13 pages.
"International Search Report and Written Opinion", Application No. PCT/US2015/064283, dated Apr. 15, 2016, 7 pages.
"International Search Report and Written Opinion", Application No. PCT/US2015/064225, dated Apr. 22, 2016, 7 pages.
"International Search Report and Written Opinion", Application No. PCT/US2016/014797, dated May 11, 2016, 7 pages.
"International Search Report and Written Opinion", Application No. PCT/US2016/016045, dated May 24, 2016, 9 pages.
"International Search Report and Written Opinion", Application No. PCT/US2015/064231, dated May 30, 2016, 8 pages.
"Non-Final Office Action", U.S. Appl. No. 15/792,960, dated Mar. 19, 2020, 6 pages.
"Non-Final Office Action", U.S. Appl. No. 15/546,196, dated Apr. 5, 2018, 22 pages.
"Non-Final Office Action", U.S. Appl. No. 15/545,944, dated May 18, 2018, 6 pages.
"Non-Final Office Action", U.S. Appl. No. 15/544,283, dated Jun. 8, 2018, 8 pages.
"Non-Final Office Action", U.S. Appl. No. 15/545,960, dated Jun. 15, 2018, 12 pages.
"Non-Final Office Action", U.S. Appl. No. 14/983,695, dated Aug. 1, 2017, 6 pages.
"Non-Final Office Action", U.S. Appl. No. 15/545,957, dated Aug. 16, 2019, 19 pages.
"Non-Final Office Action", U.S. Appl. No. 15/549,061, dated Sep. 5, 2018, 11 pages.
"Non-Final Office Action", U.S. Appl. No. 15/545,957, dated Oct. 15, 2018, 15 pages.
"Notice of Allowance", U.S. Appl. No. 15/545,957, dated Mar. 12, 2020, 10 pages.
"Notice of Allowance", U.S. Appl. No. 15/549,025, dated Sep. 3, 2019, 7 pages.
"Notice of Allowance", U.S. Appl. No. 15/545,944, dated Oct. 19, 2018, 8 pages.
"Restriction Requirement", U.S. Appl. No. 15/792,960, dated Jan. 9, 2020, 6 pages.
"Restriction Requirement", U.S. Appl. No. 14/983,695, dated Jun. 29, 2017, 8 pages.
"Restriction Requirement", U.S. Appl. No. 15/545,957, dated Sep. 17, 2018, 9 pages.
"Notice of Allowance", U.S. Appl. No. 16/208,828, dated Nov. 12, 2020, 7 pages.
"Final Office Action", U.S. Appl. No. 15/792,960, dated Sep. 22, 2020, 7 Pages.
"Non-Final Office Action", U.S. Appl. No. 16/208,828, dated Jul. 21, 2020, 9 Pages.
"Supplemental Notice of Allowance", U.S. Appl. No. 16/208,828, dated Feb. 19, 2021, 2 pages.

* cited by examiner

METHOD OF AUTOMATICALLY CONTROLLING AN AUTONOMOUS VEHICLE BASED ON ELECTRONIC MESSAGES FROM ROADSIDE INFRASTRUCTURE OR OTHER VEHICLES

CROSS-REFERENCE TO RELATED APPLICATION

This application is a continuation application and claims benefit under 35 U.S.C. § 120 of U.S. patent application Ser. No. 15/546,196, filed Jul. 25, 2017 which is a national stage application under 35 U.S.C. § 371 of PCT Application Number PCT/US2015/64235 having an international filing date of Dec. 7, 2015, which designated the United States, said PCT application claiming the benefit of priority under Article 8 of the Patent Cooperation Treaty to U.S. Provisional Patent Application No. 62/112,786, filed Feb. 6, 2015, the entire disclosures of each of which are hereby incorporated herein by reference.

TECHNICAL FIELD OF THE INVENTION

The invention relates to a method of automatically controlling an autonomous vehicle, particularly to a method based on receiving electronic messages from roadside infrastructure or other vehicles.

BACKGROUND OF THE INVENTION

Some vehicles are configured to operate automatically so that the vehicle navigates through an environment with little or no input from a driver. Such vehicles are often referred to as "autonomous vehicles". These autonomous vehicles typically include one or more sensors that are configured to sense information about the environment. The autonomous vehicle may use the sensed information to navigate through the environment. For example, if the sensors sense that the autonomous vehicle is approaching an intersection with a traffic signal, the sensors must determine the state of the traffic signal to determine whether the autonomous vehicle needs to stop at the intersection. The traffic signal may be obscured to the sensor by weather conditions, roadside foliage, or other vehicles between the sensor and the traffic signal. Therefore, a more reliable method of determining the status of roadside infrastructure is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a method off operating an autonomous vehicle is provided. The method includes the step of receiving a message from roadside infrastructure via an electronic receiver and the step of providing, by a computer system in communication with the electronic receiver, instructions based on the message to automatically implement countermeasure behavior by a vehicle system.

According to a first example, the roadside infrastructure is a traffic signaling device and data contained in the message includes a device location, a signal phase, and a phase timing. The vehicle system is a braking system. The step of providing instructions includes the sub-steps of:
  determining a vehicle speed,
  determining the signal phase in a current vehicle path,
  determining a distance between the vehicle and the device location, and
  providing, by the computer system, instructions to the braking system to apply vehicle brakes based on the vehicle speed, the signal phase of the current vehicle path, and the distance between the vehicle and the device location.

According to a second example, the roadside infrastructure is a construction zone warning device and data contained in the message includes the information of a zone location, a zone direction, a zone length, a zone speed limit, and/or lane closures. The vehicle system may be a braking system, a steering system, and/or a powertrain system. The step of providing instructions may include the sub-steps of:
  determining a vehicle speed,
  determining a lateral vehicle location within a roadway,
  determining a distance between the vehicle and the zone location,
  determining a difference between the vehicle speed and the zone speed limit,
  providing, by the computer system, instructions to apply vehicle brakes based on the difference between the vehicle speed and the zone speed limit and the distance between the vehicle and the zone location,
  determining a steering angle based on the lateral vehicle location, the lane closures, the vehicle speed, and the distance between the vehicle and the zone location,
  providing, by the computer system, instructions to the steering system to adjust a vehicle path based on the steering angle, and
  providing, by the computer system, instructions to the powertrain system to adjust the vehicle speed so the vehicle speed is less than or equal to the zone speed limit.

According to a third example, the roadside infrastructure is a stop sign and data contained in the message includes sign location and stop direction. The vehicle system is a braking system. The step of providing instructions may include the sub-steps:
  determining vehicle speed,
  determining the stop direction of a current vehicle path,
  determining a distance between the vehicle and the sign location, and
  providing, by the computer system, instructions to the braking system to apply vehicle brakes based on a vehicle speed, the stop direction of the current vehicle path, and the distance between the vehicle and the sign location.

According to a fourth example, the roadside infrastructure is a railroad crossing warning device and data contained in the message includes device location and warning state. The vehicle system is a braking system. The step of providing instructions includes the sub-steps of:
  determining vehicle speed,
  determining the warning state,
  determining a distance between the vehicle and the device location, and
  providing, by the computer system, instructions to the braking system to apply vehicle brakes based on the vehicle speed, warning state, and the distance between the vehicle and the device location.

According to a fifth example, the roadside infrastructure is an animal crossing zone warning device and data contained in the message includes zone location, zone direction, and zone length. The vehicle system is a forward looking sensor. The step of providing instructions includes the sub-step of providing, by the computer system, instructions to the forward looking sensor to widen a field of view so as to include at least both road shoulders within the field of view.

According to a sixth example, the roadside infrastructure is a pedestrian crossing warning device and data contained in the message may be crossing location and/or warning state. The vehicle system may be a braking system and/or a forward looking sensor. The step of providing instructions may include the sub-steps of:
- providing, by the computer system, instructions to the forward looking sensor to widen a field of view so as to include at least both road shoulders within the field of view,
- determining vehicle speed,
- determining a distance between the vehicle and the crossing location, and
- providing, by the computer system, instructions to the braking system to apply vehicle brakes based on the vehicle speed, warning state, and the distance between the vehicle and the crossing location.

According to a seventh example, the roadside infrastructure is a school crossing warning device and data contained in the message a device location and a warning state. The vehicle system is a braking system. The step of providing instructions includes the sub-steps of:
- determining vehicle speed,
- determining a lateral location of the device location within a roadway,
- determining a distance between the vehicle and the device location, and
- providing, by the computer system, instructions to the braking system to apply vehicle brakes based on a vehicle speed, the lateral location, the warning state, and the distance between the vehicle and the device location.

According to an eighth example, the roadside infrastructure is a lane direction indicating device and data contained in the message is a lane location and a lane direction. The vehicle system is a roadway mapping system. The step of providing instructions includes the sub-step of providing, by the computer system, instructions to the roadway mapping system to dynamically update the roadway mapping system's lane direction information.

According to a ninth example, the roadside infrastructure is a speed limiting device and data contained in the message includes a speed zone location, a speed zone direction, a speed zone length, and a zone speed limit. The vehicle system is a powertrain system. The step of providing instructions includes the sub-steps of:
- determining a vehicle speed,
- determining a distance between the vehicle and the speed zone location, and
- providing, by the computer system, instructions to the powertrain system to adjust the vehicle speed so that the vehicle speed is less than or equal to the zone speed limit.

According to a tenth example, the roadside infrastructure is a no passing zone device and data contained in the message includes a no passing zone location, a no passing zone direction, and a no passing zone length. The vehicle system includes a powertrain system, a forward looking sensor and/or a braking system. The step of providing instructions may include the sub-steps of:
- detecting another vehicle ahead of the vehicle via the forward looking sensor,
- determining a vehicle speed,
- determining an another vehicle speed.
- determine a safe passing distance for overtaking the another vehicle,
- determining a distance between the vehicle and the no passing zone location,
- providing, by the computer system, instructions to the powertrain system to adjust the vehicle speed so that the vehicle speed is less than or equal to the another vehicle speed when the safe passing distance would end within the no passing zone, and
- providing, by the computer system, instructions to the braking system to adjust the vehicle speed so that the vehicle speed is less than or equal to the another vehicle speed when the safe passing distance would end within the no passing zone.

In accordance with another embodiment, another method of operating an autonomous vehicle is provided. The method comprises the step of receiving a message from another vehicle via an electronic receiver, and the step of providing, by a computer system in communication with said electronic receiver, instructions based on the message to automatically implement countermeasure behavior by a vehicle system.

According to a first example, the other vehicle is a school bus and data contained in the message includes school bus location and stop signal status. The vehicle system is a braking system. The step of providing instructions includes the sub-steps of:
- determining a vehicle speed,
- determining the stop signal status,
- determining a distance between the vehicle and the school bus location, and
- providing, by the computer system, instructions to the braking system to apply vehicle brakes based on the vehicle speed, the stop signal status, and the distance between the vehicle and the school bus location.

According to a second example, the other vehicle is a maintenance vehicle and data contained in the message includes a maintenance vehicle location and a safe following distance. The vehicle system is a powertrain system and/or a braking system. The step of providing instructions may include the sub-steps of:
- determining a distance between the vehicle and the maintenance vehicle location,
- determining a difference between the safe following distance and the distance between the vehicle and the maintenance vehicle location by subtracting the distance between the vehicle and the maintenance vehicle location from the safe following distance,
- providing, by the computer system, instructions to the braking system to apply vehicle brakes when the difference is less than zero, and
- providing, by the computer system, instructions to the powertrain system to adjust a vehicle speed so that the difference is less than or equal to zero.

According to a third example, the other vehicle is an emergency vehicle and data contained in the message may include information regarding an emergency vehicle location, an emergency vehicle speed, and a warning light status. The vehicle system is a braking system, a steering system, a forward looking sensor, and/or a powertrain system. The step of providing instructions may include the sub-steps:

determining a distance between the vehicle and the emergency vehicle, determine a location of an unobstructed portion of a road shoulder via the forward looking sensor based on the distance between the vehicle and the emergency vehicle, the emergency vehicle speed, and warning light status, providing, by the computer system, instructions to apply vehicle brakes based on the distance between the vehicle and the emergency vehicle, the emergency vehicle speed, and the location of the unobstructed portion of the road shoulder, determining a steering angle based on the distance between the vehicle and the emergency vehicle, the emergency vehicle speed, and the location of the unobstructed portion of the road shoulder, providing, by the computer system, instructions to the steering system to adjust a vehicle path based on the steering angle, and providing, by the computer system, instructions to the powertrain system to adjust a vehicle speed based on the distance between the vehicle and the emergency vehicle, the emergency vehicle speed, and the location of the unobstructed portion of the road shoulder.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Because portions of the driving environment may be obscured to environmental sensors, such as forward looking sensors, it is desirable to supplement sensor inputs. Presented herein is a method of operating an automatically controlled or "autonomous" vehicle wherein the vehicle receives electronic messages from various elements of the transportation infrastructure, such as traffic signals, signage, or other vehicles. The infrastructure contains wireless transmitters that broadcast information about the state of each element of the infrastructure, such as location and operational state. The information may be broadcast by a separate transmitter associated with each element of infrastructure or it may be broadcast by a central transmitter. The infrastructure information is received by the autonomous vehicle and a computer system on-board the autonomous vehicle then determines whether countermeasures are required by the autonomous vehicle and sends instructions to the relevant vehicle system, e.g. the braking system, to perform the appropriate actions.

Figure 1:
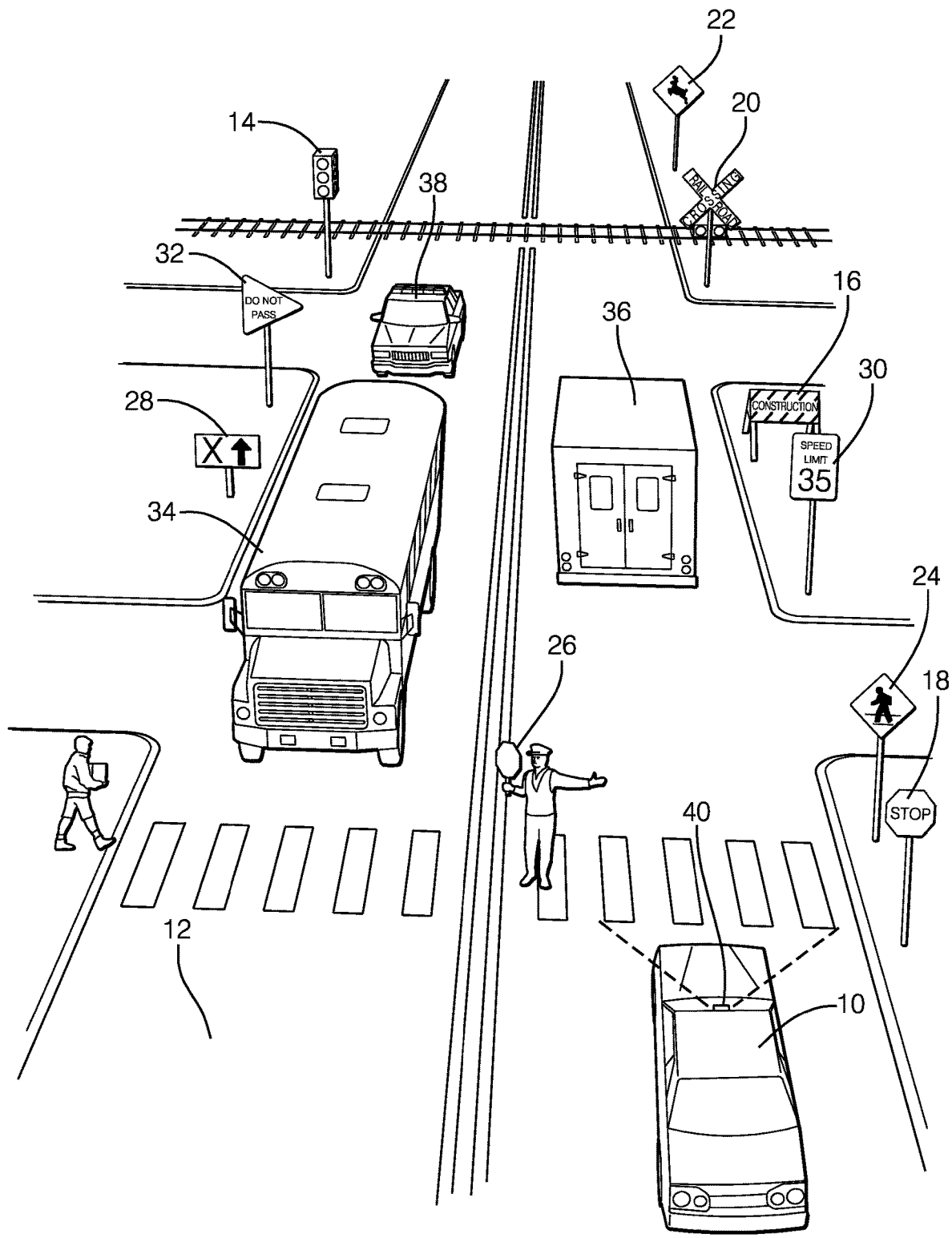
FIG. 1 is a diagram of an operating environment for an autonomous vehicle.

FIG. 1 illustrates a non-limiting example of an environment in which an automatically controlled vehicle, hereinafter referred to as the autonomous vehicle 10, may operate. The autonomous vehicle 10 travels along a roadway 12 having various associated infrastructure elements. The illustrated examples of infrastructure elements include:

a traffic signaling device 14, e.g. "stop light'. The traffic signaling device 14 transmits an electronic signal that includes information regarding the traffic signaling device's location, signal phase, e.g. direction of stopped traffic, direction of flowing traffic, left or right turn indicators active, and phase timing, i.e. time remaining until the next phase change.

a construction zone warning device 16 that may include signage, barricades, traffic barrels, barriers, or flashers. The construction zone warning device 16 transmits an electronic signal that may include information regarding the location of the construction zone, the construction zone direction, e.g. northbound lanes, the length of the construction zone, the speed limit within the construction zone, and an indication of any roadway lanes that are closed.

a stop sign 18. The stop sign 18 transmits an electronic signal that may include information regarding the sign location, stop direction, i.e. the autonomous vehicle 10 needs to stop or cross traffic needs to stop, and number of stop directions, i.e. two or four way stop.

a railroad crossing warning device 20. The railroad crossing warning device 20 transmits an electronic signal that may include information regarding the railroad crossing warning device location and warning state.

an animal crossing zone warning device 22, e.g. a deer area or moose crossing sign. The animal crossing zone warning device 22 transmits an electronic signal that may include information regarding the animal crossing zone location, animal crossing zone direction, e.g. southbound lanes, and animal crossing zone length a pedestrian crossing warning device 24. The pedestrian warning device may be a sign marking a pedestrian crossing or it may incorporate a warning system activated by the pedestrian when entering the crossing. The pedestrian crossing warning device 24 transmits an electronic signal that may include information regarding the pedestrian crossing location and warning state, e.g. pedestrian in walkway.

a school crossing warning device 26. The school crossing warning device 26 may be a handheld sign used by a school crossing guard. A warning signal, in the form of flashing lights may be activated by the crossing guard when a child is in the crossing. The school crossing warning device 26 transmits an electronic signal that may include information regarding the school crossing warning device location and warning state.

a lane direction indicating device 28. The lane direction indicating device 28 transmits an electronic signal that may include information regarding the lane location and a lane direction of each lane location.

a speed limiting device 30, e.g. a speed limit sign. The speed limiting device 30 transmits an electronic signal that may include information regarding the speed zone's location, the speed zone's direction, the speed zone length, and the speed limit within the speed zone.

a no passing zone warning device 32, e.g. a no passing zone sign. The no passing zone warning device 32 transmits an electronic signal that may include information regarding the no passing zone's location, the no passing zone's direction, and the no passing zone's length.

The environment in which the autonomous vehicle 10 operates may also include other vehicles with which the autonomous vehicle 10 may interact. The illustrated examples of other vehicles include:

a school bus 34. The school bus 34 transmits an electronic signal that includes information regarding the school bus's location and stop signal status.

a maintenance vehicle 36, e.g. snow plow or lane marker. The maintenance vehicle 36 transmits an electronic signal that includes information regarding the maintenance vehicle's location and the safe following distance required.

an emergency vehicle 38, e.g. police car or ambulance. The emergency vehicle 38 transmits an electronic signal that includes information regarding the emergency vehicle's location, the emergency vehicle's speed, and the emergency vehicle's warning light status.

The autonomous vehicle 10 includes a computer system connected to a wireless receiver that is configured to receive the electronic messages from the transmitters associated with the infrastructure and/or other vehicles. The transmitters and receivers may be configured to communicate using any of a number of protocols, including Dedicated Short Range Communication (DSRC) or WWI (IEEE 802.11x). The transmitters and receivers may alternatively be transceivers allowing two-way communication between the infrastructure and/or other vehicles and the autonomous vehicle 10. The computer system is interconnected to various sensors and actuators responsible for controlling the various systems in the autonomous vehicle 10, such as the braking system, the powertrain system, and the steering system. The computer system may be a central processing unit or may be several distributed processors communication over a communication bus, such as a Controller Area Network (CAN) bus.

The autonomous vehicle 10 further includes a locating device configured to determine both the geographical location of the autonomous vehicle 10 as well as the vehicle speed. An example of such a device is a Global Positioning System (GPS) receiver.

The autonomous vehicle 10 may also include a forward looking sensor 40 configured to identify objects in the forward path of the autonomous vehicle 10. Such a forward looking sensor 40 may be a visible light camera, an infrared camera, a radio detection and ranging (RADAR) transceiver, and/or a laser imaging, detecting and ranging (LIDAR) transceiver.

Figure 2:
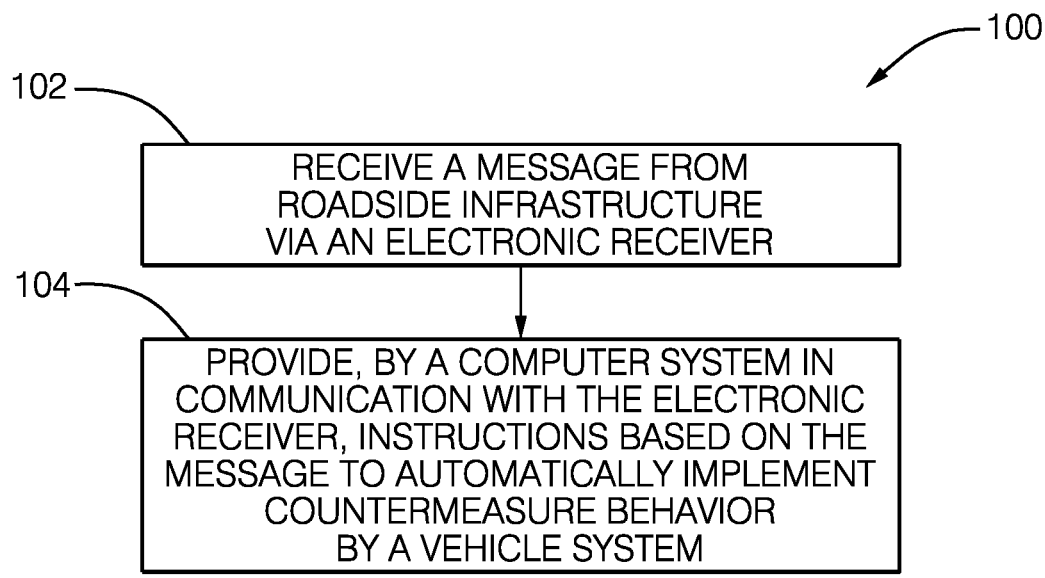
FIG. 2 is flowchart of a method of operating an autonomous vehicle according to a first embodiment.

FIG. 2 illustrates a non-limiting example of a method 100 of automatically operating an autonomous vehicle 10. The method 100 includes STEP 102, RECEIVE A MESSAGE FROM ROADSIDE INFRASTRUCTURE VIA AN ELECTRONIC RECEIVER, that include receiving a message transmitted from roadside infrastructure via an electronic receiver within the autonomous vehicle 10. As used herein, roadside infrastructure may refer to controls, signage, sensors, or other components of the roadway 12 on which the autonomous vehicle 10 travels.

The method 100 further includes STEP 104, PROVIDE, BY A COMPUTER SYSTEM IN COMMUNICATION WITH THE ELECTRONIC RECEIVER, INSTRUCTIONS BASED ON THE MESSAGE TO AUTOMATICALLY IMPLEMENT COUNTERMEASURE BEHAVIOR BY A VEHICLE SYSTEM, that includes providing instructions to a vehicle system to automatically implement countermeasure behavior. The instructions are sent to the vehicle system by a computer system that is in communication with the electronic receiver and the instruction are based on the information contained within a message received from the roadside infrastructure by the receiver.

Figure 3:
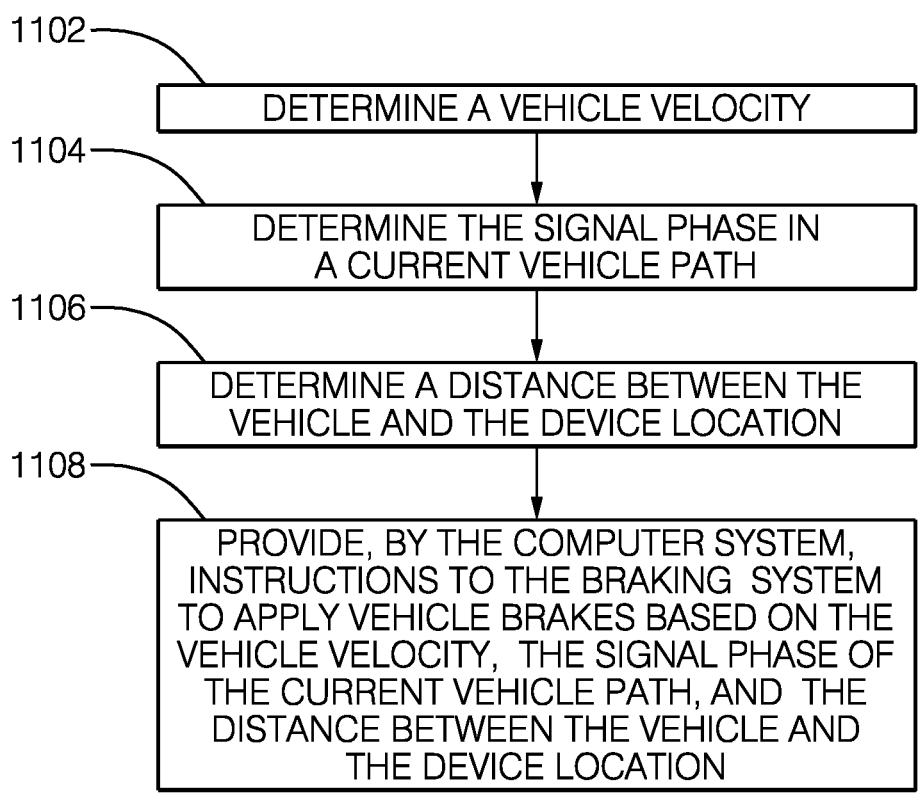
FIG. 3 is flowchart of a first set of sub-steps of STEP 104 of the method illustrated in FIG. 2.

FIG. 3 illustrates a first set of sub-steps that may be included in STEP 104. This set of sub-steps are used to automatically stop the autonomous vehicle 10 when approaching a traffic signaling device 14, e.g. stop light. SUB-STEP 1102, DETERMINE A VEHICLE SPEED, includes determining the speed of the autonomous vehicle 10 via the locating device. SUB-STEP 1104, DETERMINE THE SIGNAL PHASE IN A CURRENT VEHICLE PATH, includes determining the signal phase, e.g. red, yellow, green, of the traffic signaling device 14 along the autonomous vehicle's desired path. SUB-STEP 1106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the traffic signaling device 14 contained within the message received from the traffic signaling device 14. SUB-STEP 1108, PROVIDE, BY THE COMPUTER SYSTEM, INSTRUCTIONS TO THE BRAKING SYSTEM TO APPLY VEHICLE BRAKES BASED ON THE VEHICLE SPEED, THE SIGNAL PHASE OF THE CURRENT VEHICLE PATH, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the intersection controlled by the traffic signaling device 14 based on the traffic signal phase, the time remaining before the next phase change, the vehicle speed, the distance between the autonomous vehicle and the traffic signaling device location. The forward looking sensor 40 may also be employed to adjust the braking rate to accommodate other vehicles already stopped at the intersection controlled by the traffic signaling device 14.

Figure 4:
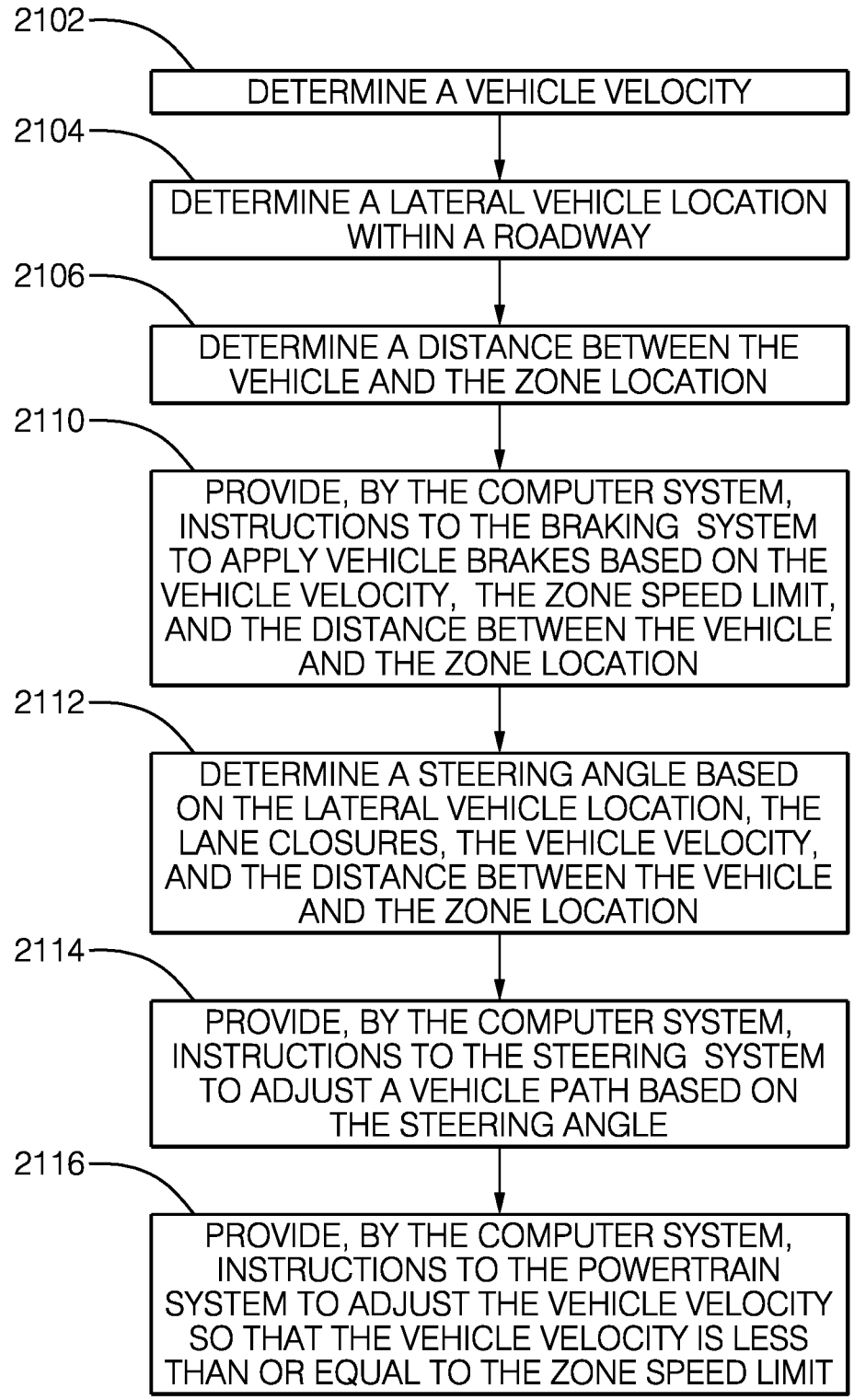
FIG. 4 is flowchart of a second set of sub-steps of STEP 104 of the method illustrated in FIG. 2.

FIG. 4 illustrates a second set of sub-steps that may be included in STEP 104. This set of sub-steps are used to automatically control the autonomous vehicle 10 when approaching a construction zone. SUB-STEP 2102, DETERMINE A VEHICLE SPEED, includes determining the speed of the autonomous vehicle via the locating device. SUB-STEP 2104, DETERMINE A LATERAL VEHICLE LOCATION WITHIN A ROADWAY, includes determine the lateral vehicle location within a roadway 12 via the locating device so that it may be determined in which road lane the autonomous vehicle 10 is traveling. SUB-STEP 2106, DETERMINE A DISTANCE BETWEEN THE VEHICLE AND THE ZONE LOCATION, includes calculating the distance between the current location of the autonomous vehicle 10 determined by the autonomous vehicle's locating device and the location of the construction zone contained within the message received from the construction zone warning device 16. SUB-STEP 2108, DETERMINE A DIFFERENCE BETWEEN THE VEHICLE SPEED AND THE ZONE SPEED LIMIT, includes calculating the difference between the speed of the autonomous vehicle 10 determined by the autonomous vehicle's locating device and the speed limit of the construction zone contained within the message received from the construction zone warning device 16. SUB-STEP 2110, PROVIDE, BY THE COMPUTER SYSTEM, INSTRUCTIONS TO THE BRAKING SYSTEM TO APPLY VEHICLE BRAKES BASED ON THE VEHICLE SPEED, THE ZONE SPEED LIMIT, AND THE DISTANCE BETWEEN THE VEHICLE AND THE ZONE LOCATION, includes sending instructions to the vehicle braking system to apply brakes when it is determined that the autonomous vehicle 10 will need to come to a reduce speed before reaching the construction zone based on the vehicle speed, the speed limit within the construction zone, and the distance between the autonomous vehicle 10 and the construction zone location. SUB-STEP 2112, DETERMINE A STEERING ANGLE BASED ON THE LATERAL VEHICLE LOCATION, THE LANE CLOSURES, THE VEHICLE SPEED, AND THE DISTANCE BETWEEN THE VEHICLE AND THE ZONE LOCATION, includes determining a steering angle to change lanes from a lane that is closed in the construction zone to a lane that is open within the construction zone when it is determined by the lateral location of the autonomous vehicle that the autonomous vehicle 10 is traveling in a lane that is indicated as closed in the message received from the construction zone warning device 16. SUB-STEP 2114, PROVIDE, BY THE COMPUTER SYSTEM, INSTRUCTIONS TO THE STEERING SYSTEM TO ADJUST A VEHICLE PATH BASED ON THE STEERING ANGLE, includes sending instructions from the computer system to the steering system to adjust the vehicle path based on the steering angle determined in SUB-STEP 2112. SUB-STEP 2116, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ZONE SPEED LIMIT, includes sending instructions from the computer system to the powertrain system to adjust the vehicle speed so that the vehicle speed is less than or equal to the speed limit for the construction zone contained in the message received from the construction zone warning device 16.

Figure 5:
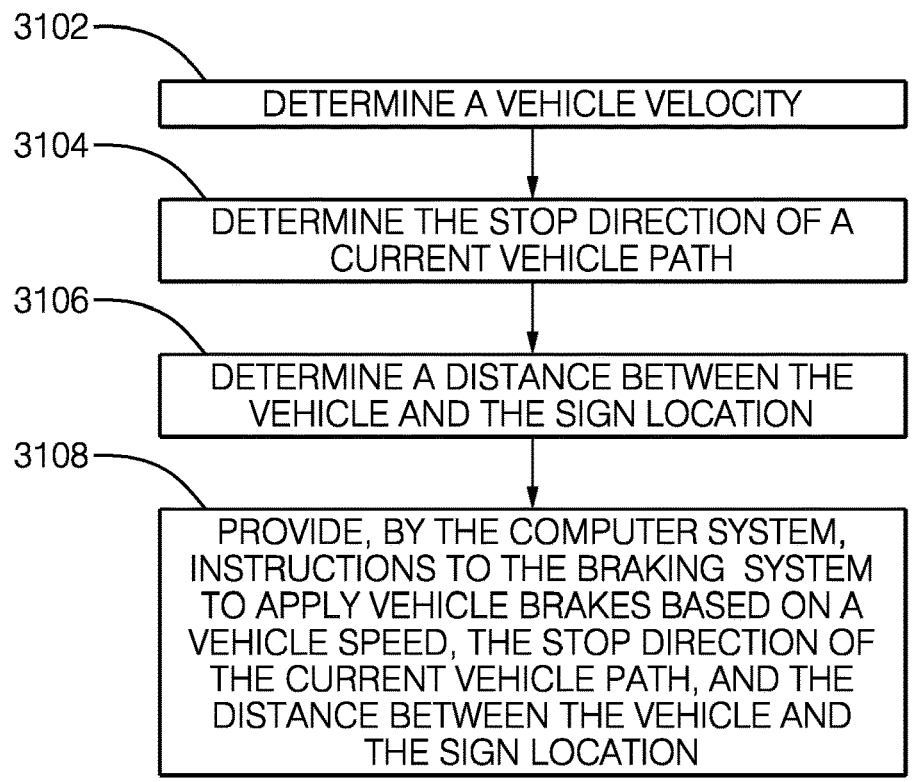
FIG. 5 is flowchart of a third set of sub-steps of STEP 104 of the method illustrated in FIG. 2.

FIG. 5 illustrates a third set of sub-steps that may be included in STEP 104. This set of sub-steps are used to automatically stop the autonomous vehicle 10 when approaching a stop sign 18. SUB-STEP 3102, DETERMINE A VEHICLE SPEED, includes determining the speed of the autonomous vehicle 10 via the locating device. Sub-step 3104, DETERMINE THE STOP DIRECTION OF A CURRENT VEHICLE PATH, includes determining whether the autonomous vehicle 10 needs to stop at the intersection controlled by the stop sign 18 based on the current direction of travel determined by the autonomous vehicle's locating device and direction of traffic required to stop reported in the message received from the stop sign transmitter. SUB-STEP 3106, DETERMINE A DISTANCE BETWEEN THE VEHICLE AND THE SIGN LOCATION, includes calculating the distance between the current location of the autonomous vehicle determined by the autonomous vehicle's locating device and the location of the stop sign 18 contained within the message received from the stop sign transmitter. SUB-STEP 3108, PROVIDE, BY THE COMPUTER SYSTEM, INSTRUCTIONS TO THE BRAKING SYSTEM TO APPLY VEHICLE BRAKES BASED ON THE VEHICLE SPEED, THE SIGNAL PHASE OF THE CURRENT VEHICLE PATH, AND THE DISTANCE BETWEEN THE VEHICLE AND THE SIGN LOCATION, includes sending instructions to the vehicle braking system to apply brakes when it is determined that the autonomous vehicle 10 will need to come to a stop at the intersection controlled by the stop sign 18 based on the direction of traffic required to stop reported in the message received from the stop sign transmitter, the vehicle speed, and the distance between the autonomous vehicle 10 and the stop sign 18 location. The forward looking sensor 40 may also be employed to adjust the braking rate to accommodate other vehicles already stopped at the intersection controlled by the stop sign 18.

Figure 6:
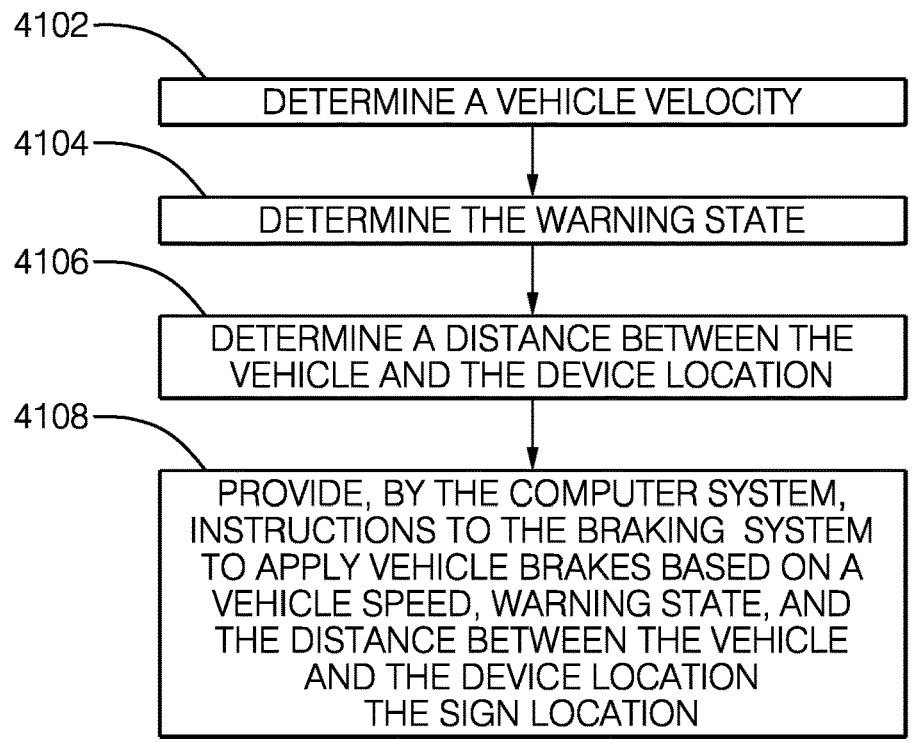
FIG. 6 is flowchart of a fourth set of sub-steps of STEP 104 of the method illustrated in FIG. 2.

FIG. 6 illustrates a fourth set of sub-steps that may be included in STEP 104. This set of sub-steps are used to automatically stop the autonomous vehicle 10 when approaching a railroad crossing. SUB-STEP 4102, DETERMINE A VEHICLE SPEED, includes determining the speed of the autonomous vehicle via the locating device. SUB-STEP 4104, DETERMINE THE WARNING STATE, includes determining the warning state of the railroad crossing warning device 20. SUB-STEP 4106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the railroad crossing warning device 20 contained within the message received from the railroad crossing warning device 20. SUB-STEP 4108, PROVIDE, BY THE COMPUTER SYSTEM, INSTRUCTIONS TO THE BRAKING SYSTEM TO APPLY VEHICLE BRAKES BASED ON THE VEHICLE SPEED, WARNING STATE, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the railroad crossing based on the warning state, the vehicle speed, the distance between the autonomous vehicle 10 and the railroad crossing warning device location. The forward looking sensor 40 may also be employed to adjust the braking rate to accommodate other vehicles already stopped at the railroad crossing.

Figure 7:
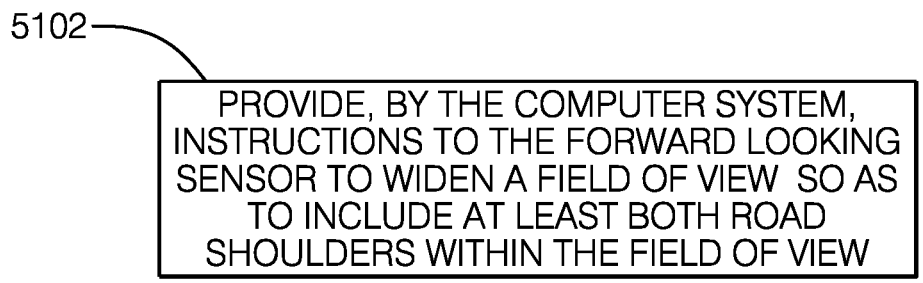
FIG. 7 is flowchart of a fifth set of sub-steps of STEP 104 of the method illustrated in FIG. 2.

FIG. 7 illustrates a fifth set of sub-steps that may be included in STEP 104. This set of sub-steps are used to automatically increase the field of view of the forward looking sensor 40 when the autonomous vehicle is approaching an animal crossing zone. SUB-STEP 5102, PROVIDE, BY THE COMPUTER SYSTEM, INSTRUCTIONS TO THE FORWARD LOOKING SENSOR TO WIDEN A FIELD OF VIEW SO AS TO INCLUDE AT LEAST BOTH ROAD SHOULDERS WITHIN THE FIELD OF VIEW, includes sending instructions to the forward looking sensor 40 to widen the field of view of the forward looking sensor 40 to include at least both shoulders of the roadway 12 when the receiver receives a message from an animal crossing zone warning device 22 and it is determined that the autonomous vehicle 10 has entered the animal crossing zone. Increasing the field of view will increase the likelihood that the forward looking sensor 40 will detect an animal entering the roadway 12.

Figure 8:
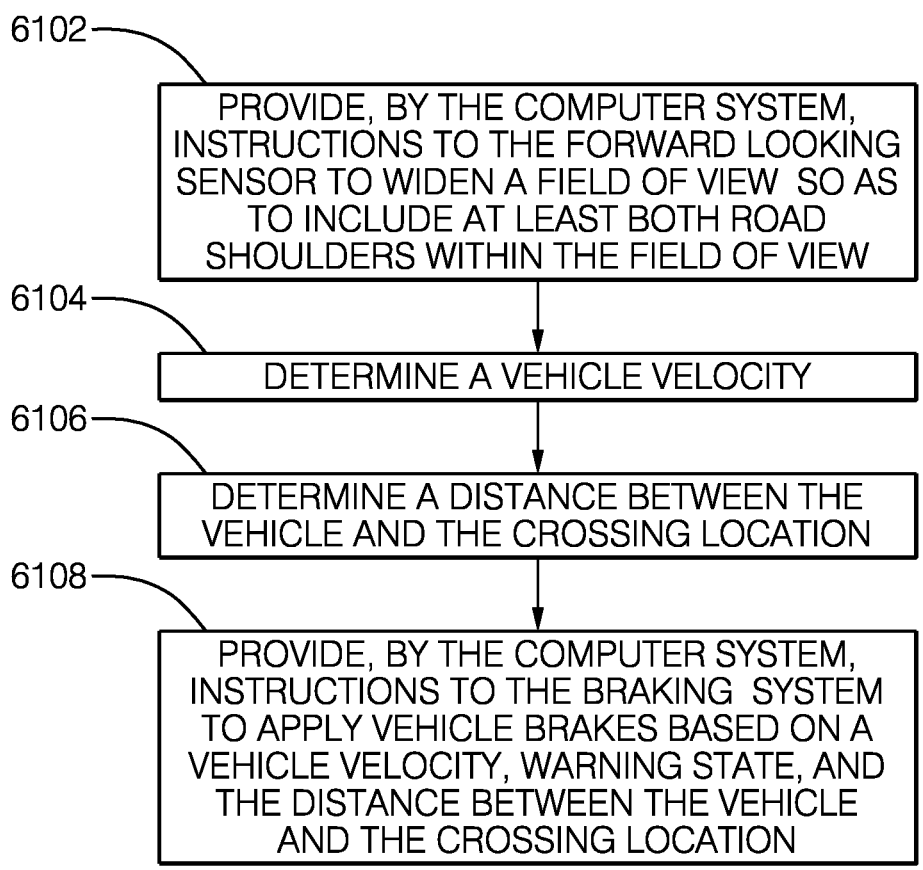
FIG. 8 is flowchart of a sixth set of sub-steps of STEP 104 of the method illustrated in FIG. 2.

FIG. 8 illustrates a sixth set of sub-steps that may be included in STEP 104. This set of sub-steps are used to automatically increase the field of view of the forward looking sensor 40 when the autonomous vehicle is approaching a pedestrian crosswalk. SUB-STEP 6102, PROVIDE, BY THE COMPUTER SYSTEM, INSTRUCTIONS TO THE FORWARD LOOKING SENSOR TO WIDEN A FIELD OF VIEW SO AS TO INCLUDE AT LEAST BOTH ROAD SHOULDERS WITHIN THE FIELD OF VIEW, includes sending instructions to the forward looking sensor 40 to widen the field of view of the forward looking sensor 40 to include at least both shoulders of the roadway 12 when the receiver receives a message from a pedestrian crossing warning device 24 and it is determined that the autonomous vehicle 10 is near the crosswalk controlled by the pedestrian crossing warning device 24. Increasing the field of view will increase the likelihood that the forward looking sensor 40 will detect pedestrian entering the crosswalk. SUB-STEP 6104, DETERMINE A VEHICLE SPEED, includes determining the speed of the autonomous vehicle 10 via the locating device. SUB-STEP 6106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the pedestrian crossing warning device 24 contained within the message received from the pedestrian crossing warning device 24. SUB-STEP 6108, PROVIDE, BY THE COMPUTER SYSTEM, INSTRUCTIONS TO THE BRAKING SYSTEM TO APPLY VEHICLE BRAKES BASED ON THE VEHICLE SPEED, WARNING STATE, AND THE DISTANCE BETWEEN THE VEHICLE AND THE CROSSING LOCATION, includes sending instructions to the autonomous vehicle 10 braking system to apply brakes when it is determined that the autonomous vehicle 10 will need to come to a stop at the crosswalk based on the warning state, the vehicle speed, the distance between the autonomous vehicle and the crosswalk location. The forward looking sensor 40 may also be employed to adjust the braking rate to accommodate other vehicles already stopped at the crosswalk.

Figure 9:
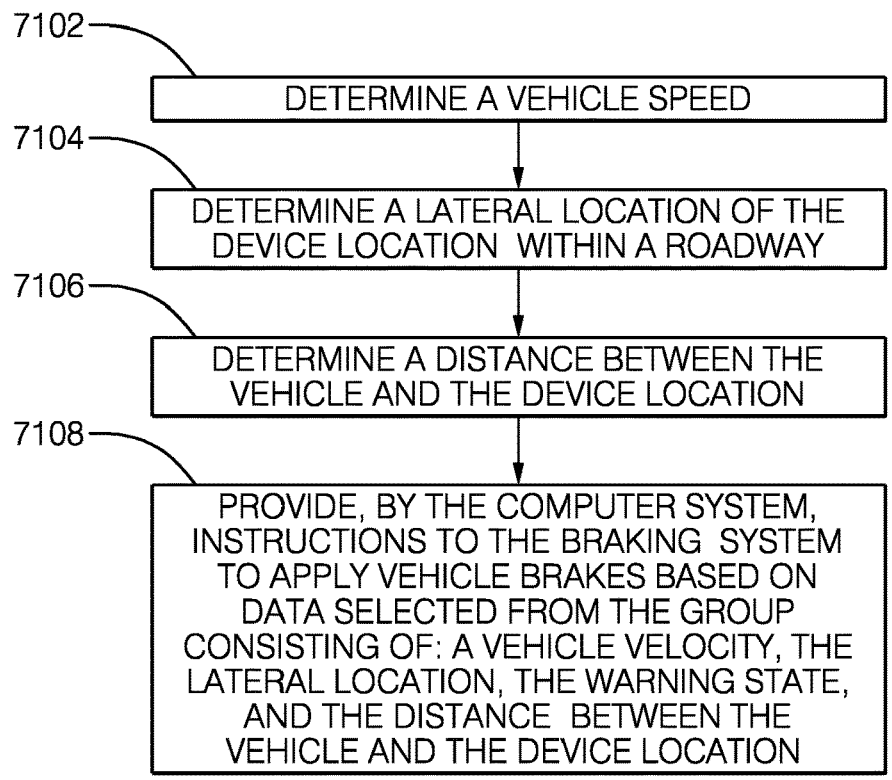
FIG. 9 is flowchart of a seventh set of sub-steps of STEP 104 of the method illustrated in FIG. 2.

FIG. 9 illustrates a seventh set of sub-steps that may be included in STEP 104. This set of sub-steps are used to automatically stop the autonomous vehicle when approaching a school crossing. SUB-STEP 7102, DETERMINE A VEHICLE SPEED, includes determining the speed of the autonomous vehicle 10 via the locating device. Sub-step 7104, DETERMINE A LATERAL LOCATION OF THE DEVICE LOCATION WITHIN A ROADWAY, includes determining the lateral position of the school crossing warning device location within the roadway 12 based on the device location reported in the message received from the school crossing warning device 26 by the receiver. If it is determined that the lateral location of the school crossing warning device 26 is within the roadway 12, the autonomous vehicle 10 will be instructed to stop regardless of the warning state received from the school crossing warning device 26. This is to ensure that failure to activate the warning state by the crossing guard operating the school crossing warning device 26 will not endanger students in the school crossing. SUB-STEP 7106, DETERMINE A DISTANCE BETWEEN THE VEHICLE AND THE DEVICE LOCATION, includes calculating the distance between the current location of the autonomous vehicle 10 determined by the autonomous vehicle's locating device and the location of the school crossing warning device 26 contained within the message received from the school crossing warning device 26. SUB-STEP 7108, PROVIDE, BY THE COMPUTER SYSTEM, INSTRUCTIONS TO THE BRAKING SYSTEM TO APPLY VEHICLE BRAKES BASED ON DATA SELECTED FROM THE GROUP CONSISTING OF: A VEHICLE SPEED, THE LATERAL LOCATION, THE WARNING STATE, AND THE DISTANCE BETWEEN THE VEHICLE AND THE DEVICE LOCATION, includes sending instructions to the vehicle braking system to apply brakes when it is determined that the autonomous vehicle 10 will need to come to a stop at the school crossing based on the warning state and/or lateral location of the school crossing warning device 26, the vehicle speed, the distance between the autonomous vehicle 10 and the location of the school crossing warning device 26. The forward looking sensor 40 may also be employed to adjust the braking rate to accommodate other vehicles already stopped at the crossing.

Figure 10:
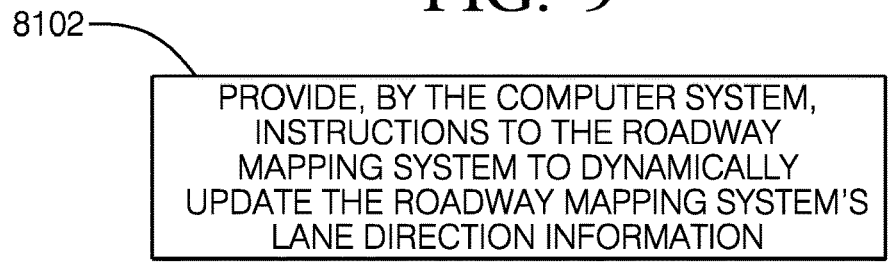
FIG. 10 is flowchart of an eighth set of sub-steps of STEP 104 of the method illustrated in FIG. 2.

FIG. 10 illustrates a eighth set of sub-steps that may be included in STEP 104. This set of sub-steps are used to automatically update the roadway mapping system to accommodate temporary lane direction changes. Sub-step 8102, PROVIDE, BY THE COMPUTER SYSTEM, INSTRUCTIONS TO THE ROADWAY MAPPING SYSTEM TO DYNAMICALLY UPDATE THE ROADWAY MAPPING SYSTEM'S LANE DIRECTION INFORMATION, includes providing by the instructions from the computer system to the roadway mapping system to dynamically update the roadway mapping system's lane direction information based on information received by the receiver from the lane direction indicating device 28. As used herein, a lane direction indicating device 28 controls the direction of travel of selected roadway lanes, such as roadway lanes that are reversed to accommodate heavy traffic during rush hours or at entrances and exits of large sporting events.

Figure 11:
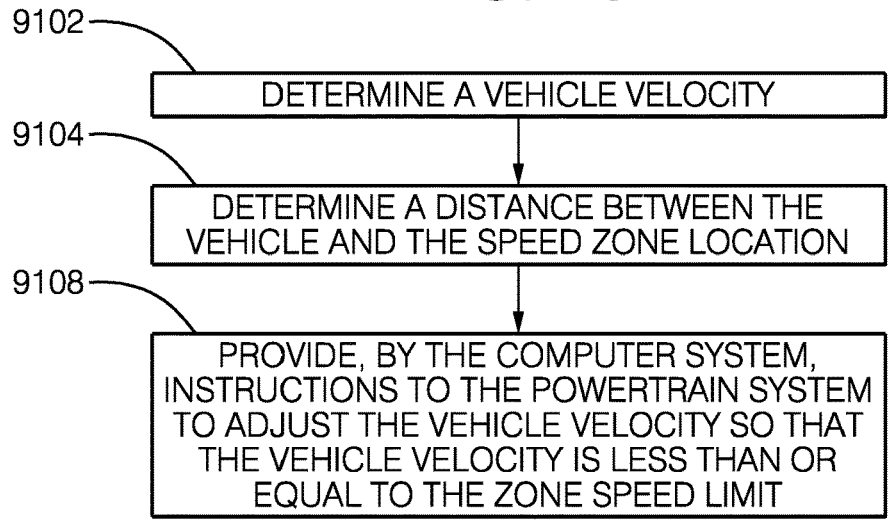
FIG. 11 is flowchart of a ninth set of sub-steps of STEP 104 of the method illustrated in FIG. 2.
Figure 12:
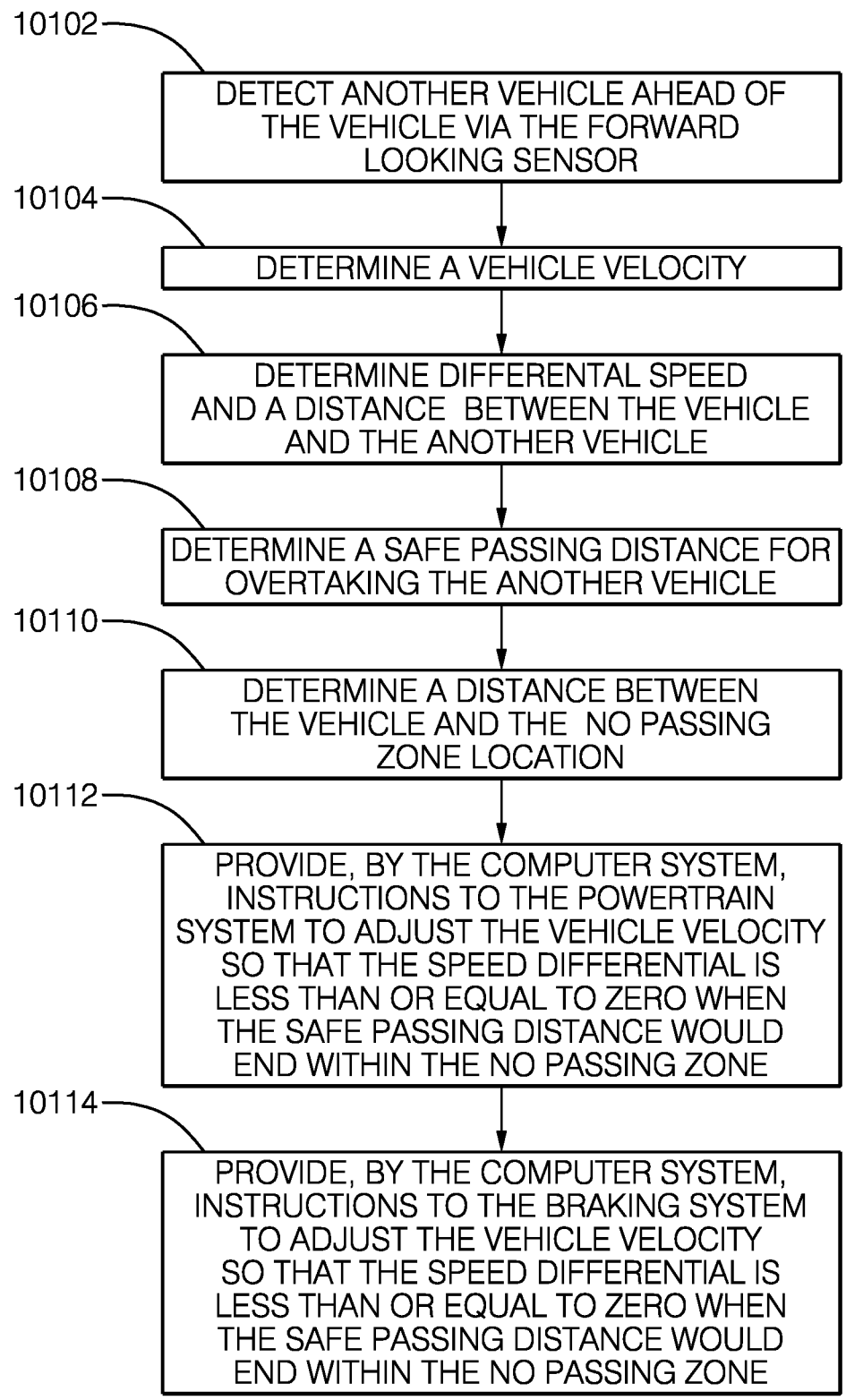
FIG. 12 is flowchart of a tenth set of sub-steps of STEP 104 of the method illustrated in FIG. 2.

FIG. 11 illustrates a ninth set of sub-steps that may be included in STEP 104. This set of sub-steps are used to automatically set the vehicle speed to match the speed limit of the section of roadway 12 on which the autonomous vehicle 10 is travelling. SUB-STEP 9102, DETERMINE A VEHICLE SPEED, includes determining the speed of the autonomous vehicle 10 via the locating device. SUB-STEP 9104, DETERMINE A DISTANCE BETWEEN THE VEHICLE AND THE SPEED ZONE LOCATION, includes calculating the distance between the current location of the autonomous vehicle 10 determined by the autonomous vehicle's locating device and the location of the speed zone contained within the message received from the speed limiting device 30. SUB-STEP 9106, DETERMINE A DIFFERENCE BETWEEN THE VEHICLE SPEED AND THE ZONE SPEED LIMIT, includes calculating the difference between the speed of the autonomous vehicle 10 determined by the autonomous vehicle's locating device and the speed limit of the speed zone contained within the message received from the speed limiting device 30. SUB-STEP 9108, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ZONE SPEED LIMIT, includes sending instructions from the computer system to the powertrain system to adjust the vehicle speed so that the vehicle speed is less than or equal to the speed limit for the speed zone contained in the message received from the speed limiting device 30.

FIG. 11 illustrates a tenth set of sub-steps that may be included in STEP 104. This set of sub-steps are used to automatically inhibit passing of another vehicle if the passing maneuver cannot be completed before the autonomous vehicle enters a no passing zone. Sub-step 10102, DETECT ANOTHER VEHICLE AHEAD OF THE VEHICLE VIA THE FORWARD LOOKING SENSOR, includes detecting the presence of another vehicle in the same traffic lane ahead of the autonomous vehicle via the forward looking sensor 40. SUB-STEP 10104, DETERMINE A VEHICLE SPEED, includes determining the speed of the autonomous vehicle 10 via the locating device. SUB-STEP 10106, DETERMINE AN ANOTHER VEHICLE SPEED AND A DISTANCE BETWEEN THE VEHICLE AND THE ANOTHER VEHICLE, includes determining a speed differential between the autonomous vehicle 10 and the other vehicle it is trailing via a RADAR or LIDAR based on data from the forward looking sensor 40. SUB-STEP 10108, DETERMINE A SAFE PASSING DISTANCE FOR OVERTAKING THE ANOTHER VEHICLE, includes calculating a safe passing distance for overtaking the other vehicle based on the vehicle speed and the speed differential. SUB-STEP 10110, DETERMINE A DISTANCE BETWEEN THE VEHICLE AND THE NO PASSING ZONE LOCATION, includes calculating the distance between the current location of the autonomous vehicle 10 determined by the autonomous vehicle's locating device and the location of the no passing zone contained within the message received from the no passing zone warning device 32, if the safe passing distance would end within the no passing zone, the method proceeds to SUB-STEPS 10112 and/or 10114. SUB-STEP 10112, PROVIDE, BY THE COMPUTER SYSTEM, INSTRUCTIONS TO THE POWERTRAIN SYSTEM TO ADJUST THE VEHICLE SPEED SO THAT THE VEHICLE SPEED IS LESS THAN OR EQUAL TO THE ANOTHER VEHICLE SPEED WHEN THE SAFE PASSING DISTANCE WOULD END WITHIN THE NO PASSING ZONE, includes sending instructions from the computer system to the powertrain system to adjust the vehicle speed so that the vehicle speed is less than or equal to the another vehicle speed when it is determined that the safe passing distance would end within the no passing zone. SUB-STEP 10114, PROVIDE, BY THE COMPUTER SYSTEM, INSTRUCTIONS TO THE BRAKING SYSTEM TO ADJUST THE VEHICLE SPEED SO THAT THE VEHICLE SPEED IS LESS THAN OR EQUAL TO THE ANOTHER VEHICLE SPEED WHEN THE SAFE PASSING DISTANCE WOULD END WITHIN THE NO PASSING ZONE, includes sending instructions from the computer system to the braking system to adjust the vehicle speed so that the vehicle speed is less than or equal to the another vehicle speed when it is determined that the safe passing distance would end within the no passing zone and that the speed differential between the vehicles exceeds the ability of the speed to be adjusted by the autonomous vehicle's powertrain system alone.

Figure 13:
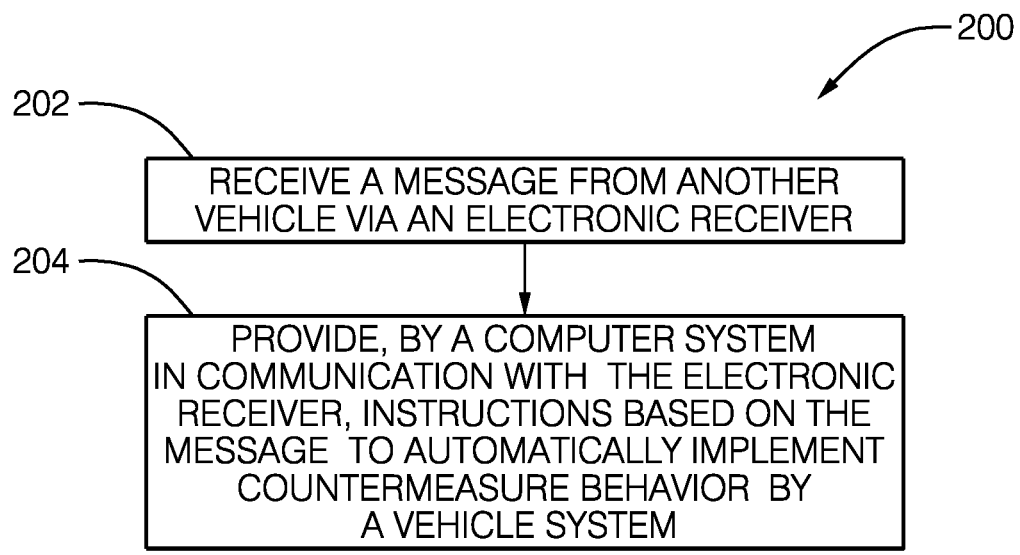
FIG. 13 is flowchart of a method of operating an autonomous vehicle according to a second embodiment.

FIG. 13 illustrates a non-limiting example of a method 200 of automatically operating an autonomous vehicle. The method 200 includes STEP 202, RECEIVE A MESSAGE FROM ANOTHER VEHICLE VIA AN ELECTRONIC RECEIVER, that includes receiving a message transmitted from another vehicle via an electronic receiver within the another vehicle.

The method 200 further includes STEP 204, PROVIDE, BY A COMPUTER SYSTEM IN COMMUNICATION WITH THE ELECTRONIC RECEIVER, INSTRUCTIONS BASED ON THE MESSAGE TO AUTOMATICALLY IMPLEMENT COUNTERMEASURE BEHAVIOR BY A VEHICLE SYSTEM, that includes providing instructions to a vehicle system to automatically implement countermeasure behavior. The instructions are sent to the vehicle system by a computer system that is in communication with the electronic receiver and the instruction are based on the information contained within a message received from the other vehicle by the receiver.

Figure 14:
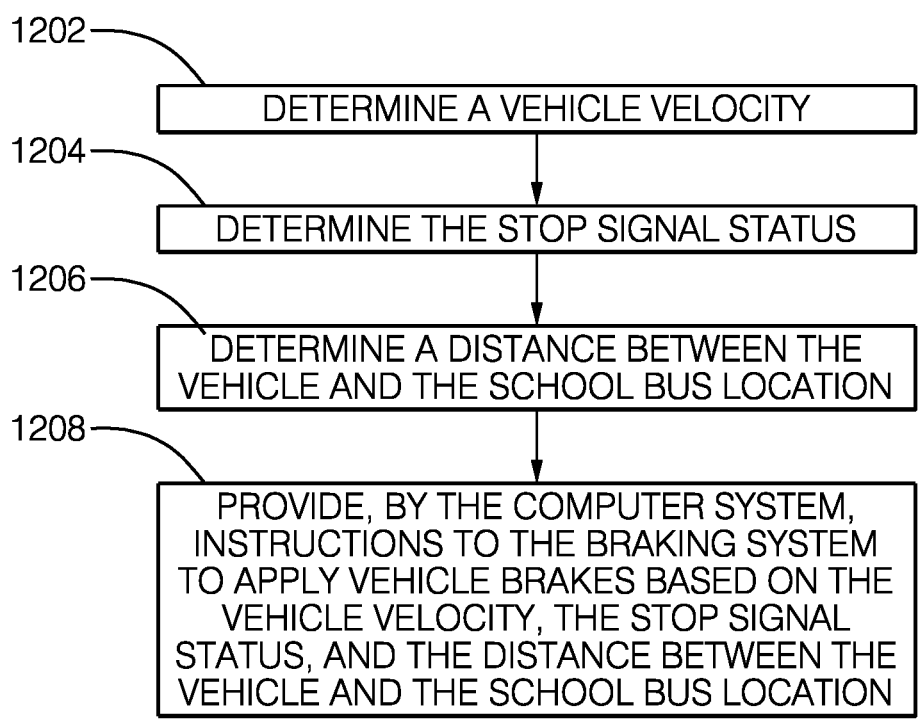
FIG. 14 is flowchart of a first set of sub-steps of STEP 204 of the method illustrated in FIG. 13.

FIG. 14 illustrates a first set of sub-steps that may be included in STEP 204. This set of sub-steps are used to automatically stop the autonomous vehicle 10 when approaching a school bus 34 that has it's stop lights activated. SUB-STEP 1202, DETERMINE A VEHICLE SPEED, includes determining the speed of the autonomous vehicle 10 via the locating device. SUB-STEP 1204, DETERMINE THE stop SIGNAL status, includes determining the status of the stop signal, e.g. off, caution, stop, reported in the message received by the receiver. SUB-STEP 1206, DETERMINE A DISTANCE BETWEEN THE VEHICLE AND THE SCHOOL BUS LOCATION, includes calculating the distance between the current location of the autonomous vehicle determined by the autonomous vehicle's locating device and the location of the school bus 34 contained within the message received from the school bus transmitter. SUB-STEP 1208, PROVIDE, BY THE COMPUTER SYSTEM, INSTRUCTIONS TO THE BRAKING SYSTEM TO APPLY VEHICLE BRAKES BASED ON THE VEHICLE SPEED, THE STOP SIGNAL STATUS, AND THE DISTANCE BETWEEN THE VEHICLE AND THE SCHOOL BUS LOCATION, includes sending instructions to the vehicle braking system to apply brakes when it is determined that the autonomous vehicle 10 will need to come to a stop at the school bus location based on the stop signal status, the vehicle speed, and the distance between the autonomous vehicle 10 and school bus location. The forward looking sensor 40 may also be employed to adjust the braking rate to accommodate other vehicles already stopped for the school bus 34.

Figure 15:
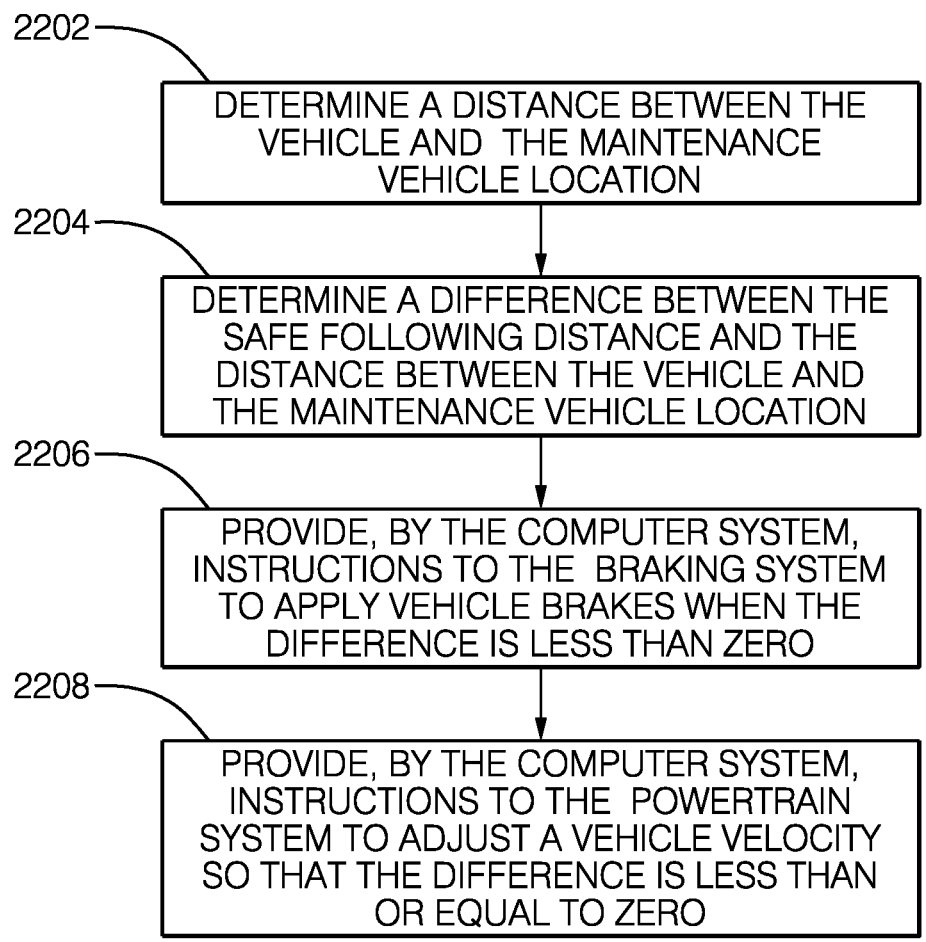
FIG. 15 is flowchart of a second set of sub-steps of STEP 204 of the method illustrated in FIG. 13.

FIG. 15 illustrates a second set of sub-steps that may be included in STEP 204. This set of sub-steps are used to automatically establish a safe following distance behind a maintenance vehicle 36. SUB-STEP 2202, DETERMINE A DISTANCE BETWEEN THE VEHICLE AND THE MAINTENANCE VEHICLE LOCATION, includes determining the distance between the autonomous vehicle 10 and the maintenance vehicle location by comparing the location of the autonomous vehicle 10 determined by the locating device with the location of the maintenance vehicle 36 contained in the message received by the receiver. SUB-STEP 2204, DETERMINE A DIFFERENCE BETWEEN THE SAFE FOLLOWING DISTANCE AND THE DISTANCE BETWEEN THE VEHICLE AND THE MAINTENANCE VEHICLE LOCATION, includes calculating the difference between the safe following distance contained in the message from the maintenance vehicle transmitter and the distance calculated in SUB-STEP 2202. SUB-STEP 2206, PROVIDE, BY THE COMPUTER SYSTEM, INSTRUCTIONS TO THE BRAKING SYSTEM TO APPLY VEHICLE BRAKES WHEN THE DIFFERENCE IS LESS THAN ZERO, includes sending instructions to the vehicle braking system to apply brakes when it is determined that the distance between the autonomous vehicle 10 and the maintenance vehicle 36 is less than the safe following distance. Sub-step 2208, PROVIDE, BY THE COMPUTER SYSTEM, INSTRUCTIONS TO THE POW- ERTRAIN SYSTEM TO ADJUST A VEHICLE SPEED SO THAT THE DIFFERENCE IS LESS THAN OR EQUAL TO ZERO, includes sending instructions from the computer system to the powertrain system to adjust the vehicle speed so that the difference in the distance between the autonomous vehicle 10 and the maintenance vehicle 36 and the safe following distance is less than or equal to zero, thus maintaining the safe following distance.

Figure 16:
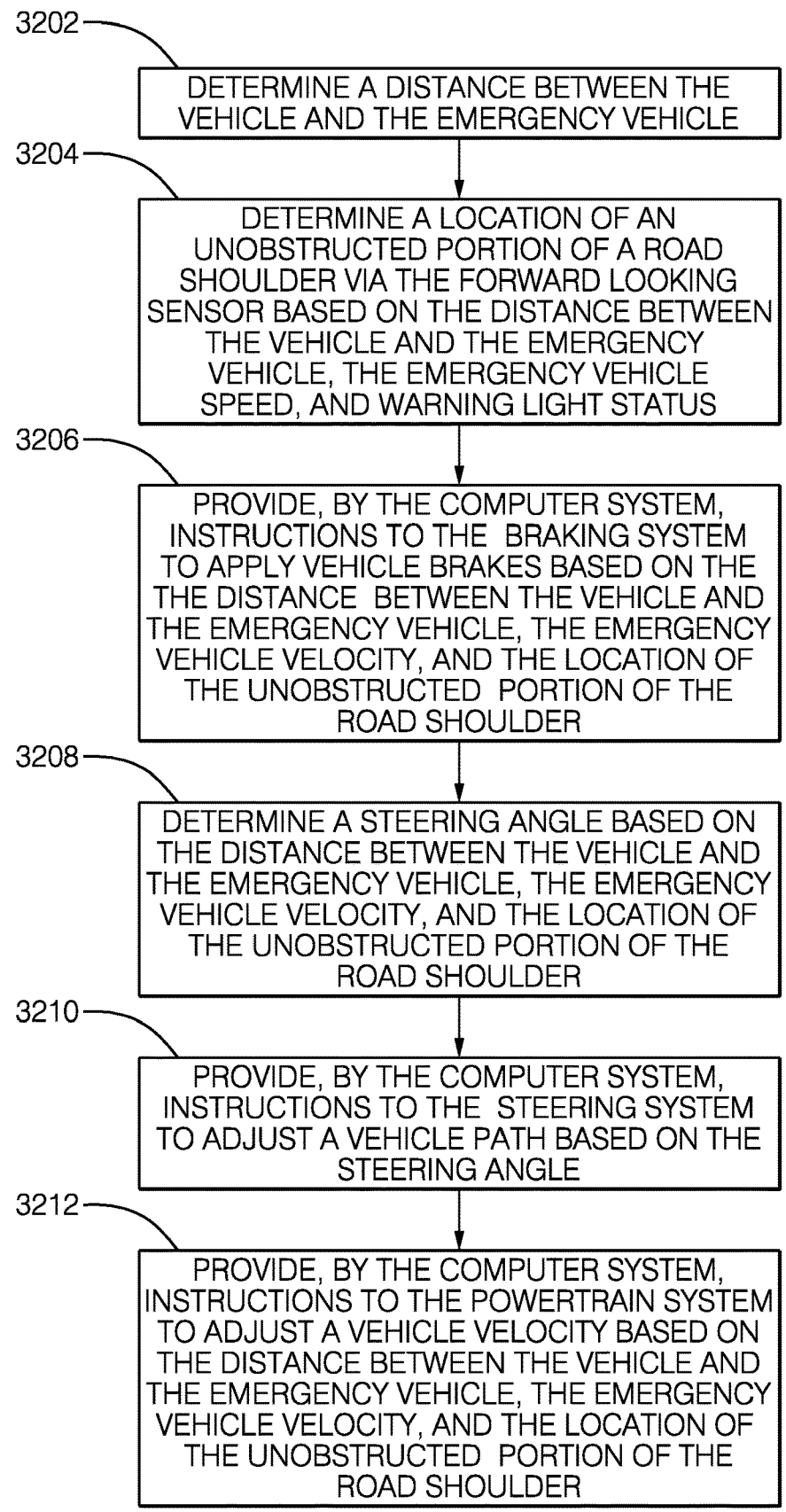
FIG. 16 is flowchart of a third set of sub-steps of STEP 204 of the method illustrated in FIG. 13.

FIG. 16 illustrates a second set of sub-steps that may be included in STEP 204. This set of sub-steps are used to automatically park the autonomous vehicle 10 on the shoulder of the road so that an emergency vehicle 38 that has it's warning lights activated can safely pass the autonomous vehicle. This vehicle behavior is required by law in various states. SUB-STEP 3202, DETERMINE A DISTANCE BETWEEN THE VEHICLE AND THE EMERGENCY VEHICLE, includes determining the distance between the autonomous vehicle 10 and the emergency vehicle location by comparing the location of the autonomous vehicle 10 determined by the locating device with the location of the emergency vehicle 38 contained in the message received by the receiver. SUB-STEP 3204, DETERMINE A LOCATION OF AN UNOBSTRUCTED PORTION OF A ROAD SHOULDER VIA THE FORWARD LOOKING SENSOR BASED ON THE DISTANCE BETWEEN THE VEHICLE AND THE EMERGENCY VEHICLE, THE EMERGENCY VEHICLE SPEED, AND WARNING LIGHT STATUS, includes using the forward looking sensor 40 to find a unobstructed portion of the shoulder of the roadway 12 in which the autonomous vehicle 10 can park in order to allow the emergency vehicle 38 to pass safely. The unobstructed location is based on the data from the forward looking sensor 40, the distance between the autonomous vehicle 10 and the emergency vehicle 38, the emergency vehicle speed, and the warning light status. SUB-STEP 3206, PROVIDE, BY THE COMPUTER SYSTEM, INSTRUCTIONS TO THE BRAKING SYSTEM TO APPLY VEHICLE BRAKES BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes sending instructions to the vehicle braking system to apply brakes to stop the autonomous vehicle 10 within the unobstructed location based on the distance between the autonomous vehicle 10 and the emergency vehicle 38, the emergency vehicle speed, and the location of the unobstructed portion of the road shoulder. The forward looking sensor 40 may also be employed to adjust the braking rate to accommodate other vehicles already stopped in the road shoulder. SUB-STEP 3208, DETERMINE A STEERING ANGLE BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes determining a steering angle based on the distance between the autonomous vehicle 10 and the emergency vehicle 38, the emergency vehicle speed, and the location of the unobstructed portion of the road shoulder. SUB-STEP 3210, PROVIDE, BY THE COMPUTER SYSTEM, INSTRUCTIONS TO THE STEERING SYSTEM TO ADJUST A VEHICLE PATH BASED ON THE STEERING ANGLE, includes sending instructions to the vehicle steering system to steer the autonomous vehicle 10 into the unobstructed location based on the steering angle determined in SUB-STEP 3208. SUB-STEP 3212, PROVIDE, BY THE COMPUTER SYSTEM, INSTRUCTIONS TO THE POWERTRAIN SYSTEM TO ADJUST A VEHICLE SPEED BASED ON THE DISTANCE BETWEEN THE VEHICLE AND THE EMERGENCY VEHICLE, THE EMERGENCY VEHICLE SPEED, AND THE LOCATION OF THE UNOBSTRUCTED PORTION OF THE ROAD SHOULDER, includes sending instructions to the vehicle powertrain system to adjust the vehicle speed based on the distance between the autonomous vehicle 10 and the emergency vehicle 38, the emergency vehicle speed, and the location of the unobstructed portion of the road shoulder.

The embodiments described herein are described in terms of an autonomous vehicle 10. However, elements of the embodiments may also be applied to warning systems that alert the driver to manually take these identified countermeasures.

Accordingly a method 100 of automatically operating an autonomous vehicle 10 is provided. The method 100 provides the benefits of allowing automatic control of the autonomous vehicle 10 when forward looking sensors 40 are be obscured.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method of operating a vehicle, comprising the steps of:
   receiving a message from a maintenance vehicle via an electronic receiver, wherein data contained in the message includes a maintenance vehicle location and a safe required following distance;
   determining a distance between the vehicle and the maintenance vehicle location;
   determining a difference between the safe required following distance and the distance between the vehicle and the maintenance vehicle location; and further comprising at least one of the steps selected from the list consisting of:
   applying vehicle brakes in response to instructions to a vehicle braking system provided by a computer system in communication with said electronic receiver in accordance with a determination that the difference between the safe required following distance and the distance between the vehicle and the maintenance vehicle location is less than zero; and
   adjusting a vehicle speed in response to instructions to a powertrain system provided by the computer system in accordance with a determination that the difference between the safe required following distance and the distance between the vehicle and the maintenance vehicle location is less than or equal to zero.

2. A method of operating a vehicle, comprising the steps of:
   receiving a message from an emergency vehicle via an electronic receiver, wherein data contained in the message includes an emergency vehicle location, an emergency vehicle speed, and a warning light status;
   determining a distance between the vehicle and the emergency vehicle;
   determine a location of an unobstructed portion of a road shoulder via a forward looking sensor based on the distance between the vehicle and the emergency vehicle, the emergency vehicle speed, and the warning light status; and further comprising at least one of the steps selected from the list consisting of:

applying vehicle brakes in response to instructions to a vehicle braking system provided by a computer system in communication with said electronic receiver, said instructions based on the distance between the vehicle and the emergency vehicle, the emergency vehicle speed, and the location of the unobstructed portion of the road shoulder;

adjusting a vehicle path in response to instructions to a vehicle steering system provided by the computer system, said instructions based on the distance between the vehicle and the emergency vehicle, the emergency vehicle speed, the warning light status, and the location of the unobstructed portion of the road shoulder; and adjusting a vehicle speed in response to instructions to a vehicle powertrain system provided by the computer system, said instructions based on the distance between the vehicle and the emergency vehicle, the emergency vehicle speed, the warning light status, and the location of the unobstructed portion of the road shoulder.

3. A method of operating a vehicle, comprising the steps of:

receiving a message from a portable school crossing warning device via an electronic receiver, wherein data contained in the message includes a school crossing device location;

determining a vehicle speed;

determining a lateral location of the school crossing device location within a roadway;

determining a distance between the vehicle and the school crossing device location; and applying vehicle brakes in response to instructions to a vehicle braking system provided by a computer system in communication with said electronic receiver, said instructions based on the vehicle speed, the lateral location of the school crossing device location within the roadway, and the distance between the vehicle and the school crossing device location.

* * * * *